United States Patent [19]

Fietzke

[11] Patent Number: 4,941,352
[45] Date of Patent: Jul. 17, 1990

[54] METHOD AND APPARATUS FOR MASS CENTERING OF A ROTOR
[75] Inventor: Günter Fietzke, Forest, Va.
[73] Assignee: Gebr. Hofmann GmbH & Co. KG Maschinenfabrik, Pfungstadt, Fed. Rep. of Germany
[21] Appl. No.: 347,565
[22] Filed: May 5, 1989
[51] Int. Cl.⁵ .............................................. G01M 1/26
[52] U.S. Cl. ............................................. 73/461; 73/65
[58] Field of Search ...................... 73/461, 460, 65, 66, 73/472

[56] References Cited
U.S. PATENT DOCUMENTS
4,644,792  2/1987  Fietzke ................................... 73/461

Primary Examiner—Jerry W. Myracle
Attorney, Agent, or Firm—Cushman, Darby & Cushman

[57] ABSTRACT

In a method and apparatus for mass centering of a rotor, the unbalance of the rotor is measured and the result of the unbalance measuring operation and the weight of the rotor are used to determine the position of the axis of inertia which extends through the center of mass of the rotor, with respect to the axis of rotation thereof. The position of the axis of inertia is marked on an end face of the rotor by a marking tool. For that purpose, to bring the position of the axis of inertia and the marking tool into the appropriate relationship, relative displacement is produced by an actuating means as between the rotor and the marking tool in the radial direction with respect to the axis of rotation of the rotor, with the rotor or the marking tool being guided in the direction of displacement by a guide means disposed at an angle with respect to the axis of rotation of the rotor. The relative displacement produced in that way takes place within a linear region of action of the marking tool, which region extends through the axis of rotation of the rotor. The point at which the axis of inertia passes through the end face of the rotor to be marked by the tool can then be turned into the region of action of the marking tool for the latter to perform the marking operation.

20 Claims, 3 Drawing Sheets

METHOD AND APPARATUS FOR MASS CENTERING OF A ROTOR

BACKGROUND OF THE INVENTION

The present invention relates generally to a method and apparatus for mass centering of a rotary body referred to herein as a rotor.

Mass centering is a process for finding an axis of rotation for a rotor such that the axis of rotation passes through the center of the net mass of the rotor which is distributed within same, so that the net distribution of mass of the rotor is symmetrical about the axis of rotation. The axis that thus passes through the center of mass of the rotor is referred to as the axis of inertia of the rotor.

Thus, the process for mass centering of a rotor by means of a mass centering machine involves ascertaining the position of the axis of inertia which extends through the center of mass of the rotor. The position of the axis of inertia is indicated by marking the point at which that axis passes through the end faces of the rotor. That is conventionally effected by means of centering bores which are produced in the ends of the rotor at the points at which the axis of inertia passes therethrough.

When effecting mass centering in one plane, that is to say when the primary axis of inertia is ascertained by measuring the static unbalance of the rotor, the axis of inertia extends parallel to the axis of rotation of the rotor. It is then sufficient for the position of the axis of inertia to be indicated by marking on only one end face of the rotor. Particularly when dealing with rotors which are of a generally disk-like configuration, it is sufficient to ascertain the position of the axis of inertia by measuring the static unbalance, that position thus being derived from the result of the unbalance measuring operation and the weight of the rotor.

In a typical method and apparatus for mass centering of a rotor, once the position of the axis of inertia has been ascertained, it is then necessary to move a marking tool which is generally in the form of a drill relative to the rotor, in a radial direction with respect to the axis of rotation of the rotor and parallel to the axis of rotation. A high level of accuracy and a high resolution capability is required on the part of the mechanical unit operable to produce that relative movement.

U.S. Pat. No. 4,644,792 discloses a method and apparatus for determining the mass center of a body, in which a high degree of resolution can be achieved. However major components of the mechanical system must be produced with a very high level of precision in order for the mechanical unit provided to produce the above-mentioned relative movement to afford the high resolution capability required.

SUMMARY OF THE INVENTION

An object of the present invention is to provide an apparatus for mass centering of a rotor, which provides a high degree of resolution accuracy while being of a simple design configuration.

Another object of the present invention is to provide an apparatus for mass centering of a rotor which while being of a robust construction affords a high degree of precision in a mass centering operation.

Still another object of the present invention is to provide a method of mass centering of a rotor, which involves a sequence of moments of a simple configuration which readily co-operate with each other to produce an accurate result.

In accordance with the present invention these and other objects are attained by an apparatus for mass centering of a rotor including an unbalance measuring means for measuring unbalance of the rotor, with a rotary spindle for carrying the rotor and means for rotating the spindle and therewith the rotor about an axis of rotation. Operatively connected to the unbalance measuring means is an evaluation means for ascertaining from the result of the unbalance measuring operation and the weight of the rotor, the position of the axis of inertia thereof, which extends through the center of gravity of the rotor, with respect to the axis of rotation of the rotor. The apparatus includes a marking means having a marking tool for marking the position of the axis of inertia on an end face of the rotor, while a displacement means is operable to produce a relative displacement between the rotor and the marking tool in a radial direction with respect to the axis of rotation and parallel to the axis of rotation. To correlate such movements, the apparatus has guide means for guiding the rotor or the marking means in the relative displacement in the radial direction with respect to the axis of rotation, with the guide means being disposed at an inclined angle with respect to the axis of rotation whereby said relative displacement in the radial direction defines on the end face of the rotor on which the position of the axis of inertia is to be marked a linear region of action of the marking tool, which extends through the axis of rotation of the rotor, whereupon the point on the end face of the rotor at which the measured axis of inertia passes therethrough can be turned into said region of action of the marking tool for the marking operation.

In another aspect the invention provides a method of mass centering of a rotor which involves measuring the unbalance of the rotor and determining from the result of the unbalance measuring step and the mass of the rotor, the position of the axis of inertia of the rotor with respect to the axis of rotation thereof. The point at which the axis of inertia passes through an end face of the rotor is then marked on that end face by means of a marking tool which has a substantially punctiform working surface. To mark the point at which the axis of inertia masses through the end face of the rotor the rotor is turned into an angular position such that said point comes to lie in a plane in which the axis of rotation of the rotor is disposed and in which the working surface of the marking tool, which is guided in a straight line, is displaceable with respect to the axis of rotation of the rotor.

As will be seen in greater detail hereinafter in connection with preferred embodiments, the invention provides for a high degree of accuracy in regard to the movements involved in displacing the rotor and the marking tool relative to each other. By virtue of the fact that the relative displacement as between the rotor and the marking tool is guided by a guide means which is disposed at a certain angle with respect to the axis of rotation which coincides with the axis of the measuring spindle of the apparatus, added to the component of movement which is parallel to the axis of rotation of the rotor is an additional component of movement which is perpendicular to that axis. The additional component is the desired radial relative displacement between the rotor and the marking tool, in relation to the axis of rotation of the rotor, that displacement corresponding to the distance of the axis of inertia from the axis of rotation.

The resolution accuracy required in respect of that relative movement can advantageously be achieved by using the principle of an inclined plane. The inclined plane can serve as a guide plane for a slide carrying the marking tool, or the rotor or unbalance measuring unit carrying same. For that purpose, the marking tool and the unbalance measuring means are preferably carried on a common one-piece base member on which the guide plane for the slide, which is inclined with respect to the axis of rotation of the rotor, is formed in a suitable fashion, for example by linear guide means which are integrally ground on the base member or which are produced in some other fashion thereon. The marking means with the marking tool is preferably carried on that slide.

It is also possible for the rotor and the marking means each to be carried on a respective slide, with the first and second slides being guided displaceably parallel to the axis of rotation of the rotor, wherein one of the first and second slides is also guided at an inclined angle with respect to the axis of rotation of the rotor.

In another preferred feature of the invention the first and second slides of that arrangement may also be interconnected by way of a connecting portion so that only one motor is required to produce displacement of the first and second slides.

In another embodiment of the apparatus according to the principles of the invention it is possible for the unbalance measuring means which provides the measuring spindle to which the rotor is secured for the unbalance measuring operation to be arranged at a stationary location on the above-mentioned common base member, with the marking tool being mounted on a slide slidable in the axial direction of the axis of rotation and inclinedly on the inclined guide plane afforded by the base member.

It will be seen therefore that, in an unbalance measuring run and when the result of the unbalance measuring run is then evaluated, having consideration to the weight of the rotor, the position of the axis of inertia of the rotor is appropriately determined. The rotor is then turned into an angular position in which the axis of inertia and the point on the end face of the rotor at which the axis of inertia passes therethrough are disposed in the plane in which the region of action of the marking tool extends, over the end face of the rotor. In the subsequent relative movement as between the rotor and the marking tool, the unbalance measuring spindle is locked in conventional manner in the unbalance measuring unit. The axis of rotation of the rotor which coincides with the axis of the measuring spindle of the unbalance measuring means and the axis of inertia of the rotor are disposed in a plane which is normal to the move-mentioned inclined plane which provides guidance for the slide co-operating therewith, in the adjusting movement of the arrangement. It is thus in that plane which is common to the axis of rotation of the rotor and the axis of inertia of the rotor and in which the region of action of the marking tool is also disposed, that the adjusting movement of the marking tool which is radial with respect to the axis of rotation takes place. The extent of the adjusting movement corresponds to the distance of the axis of inertia of the rotor from its axis of rotation. When the marking tool is in the form of a drill, the axis of the drill is moved in the above-mentioned plane, in the course of the adjusting movement, until the axis of the drill is disposed opposite the point at which the axis of inertia of the rotor passes through the end face of the rotor, being therefore the point on the end face of the rotor at which a marking is to be produced. The marking is then formed at that point by axial displacement of the drill parallel to the axis of rotation of the rotor and also the drill.

In order to compensate for lateral displacement of the measuring spindle of the unbalance measuring means with respect to the plane in which the axis of the marking tool is displaced in the course of the adjusting movement, the apparatus may include an adjusting screw which laterally engages the unbalance measuring spindle for displacing the spindle radially with respect to the axis of the spindle and perpendicularly to the above-mentioned region of action of the marking tool, in dependence on any misalignment which has been detected.

Further objects, features and advantages of the present invention will be apparent from the following description of preferred embodiments thereof.

DESCRIPTION OF THE PREFERRED EMBODIMENTS

Figure 1:
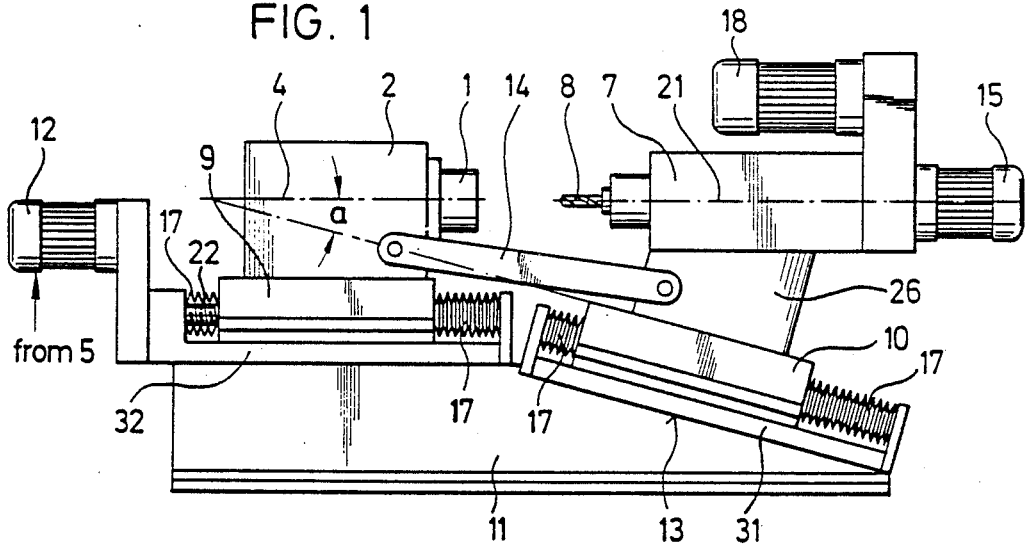
FIG. 1 is a diagrammatic side view of a first embodiment of a mass centering apparatus according to the invention.
Figure 2:
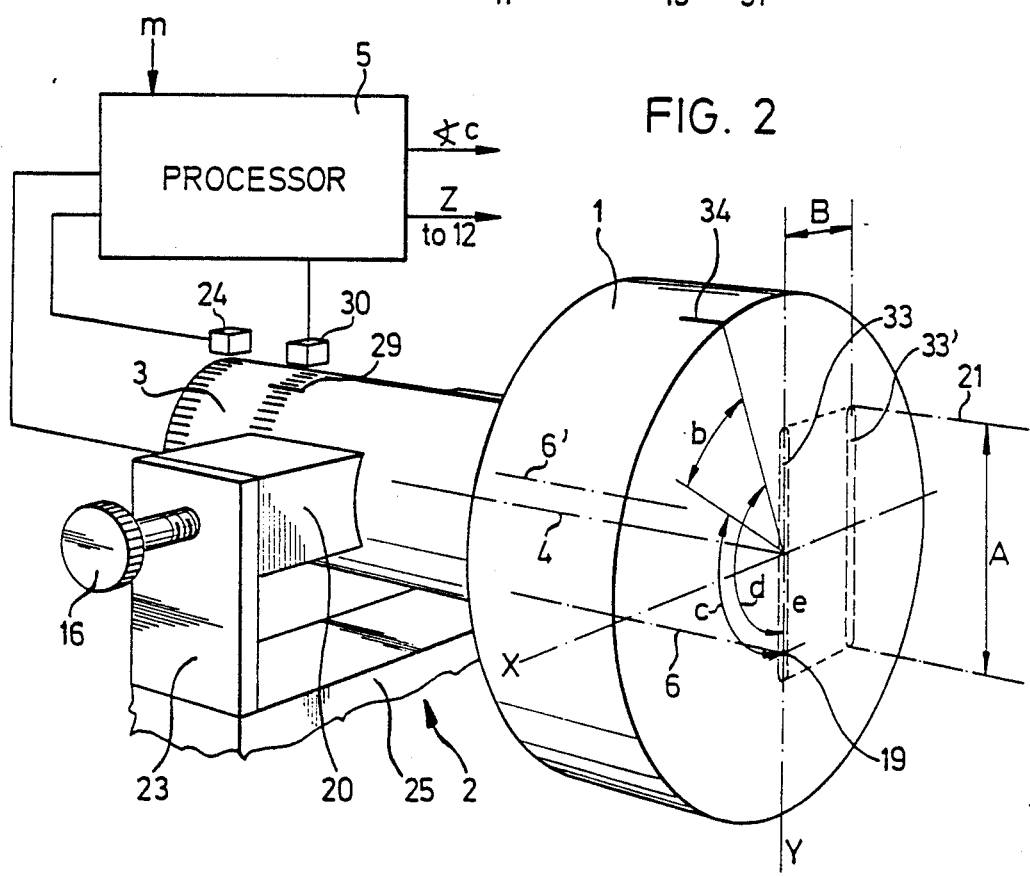
FIG. 2 is a detail view of a rotor carried on a measuring spindle of an unbalance measuring means as shown in FIG. 1.

Referring firstly to FIGS. 1 and 2, a mass centering apparatus illustrated therein for mass centering of a rotor 1 and more especially a rotor of a generally disk-like configuration, includes an unbalance measuring unit 2 having a measuring spindle indicated at 3 in FIG. 2 to which the rotor 1 is secured in conventional manner by centering and clamping means which are not shown in the drawing. The unbalance measuring unit 2 is of a conventional configuration and is suitable in particular for measuring the static unbalance of the rotor, that is to say for measuring the unbalance of the rotor in one plane. The unbalance measuring unit conventionally includes a measurement value detector or pick-up 20 which in particular can be in the form of a force measuring device, for sensing the movements of the spindle 3. The unbalance measuring unit 2 also includes an evaluation unit 5 which receives the signals from the pick-up 20 during the unbalance measuring operation and evaluates same in order to determine the result of the unbalance measuring operation, as will be discussed in greater detail hereinafter.

The unbalance measuring unit 2 also comprises an adjusting turning means (not shown) which co-operates with the spindle 3 to turn it until the rotor 1 carried on the spindle 3 is disposed in a specific angular position. In order for the rotor 1 then to be fixed in the specific angular position required, the arrangement may further include a conventional spindle locking device (not shown).

As shown in FIG. 1, the unbalance measuring unit 2 is carried on a slide 9 which is in turn mounted slidably on a base member 11. In the FIG. 1 embodiment the slide 9 is mounted slidably in parallel relationship to the axis of rotation 4 which coincides with the axis of rotation of the spindle 3. To provide suitable guidance for the slide 9, linear guide means such as guide rails or bars as indicated diagrammatically at 32 in FIG. 1 may be integrally provided on the base member 11, being formed for example by grinding thereon.

The FIG. 1 apparatus further includes a second slide 10 which carries a marking unit in the form of a drilling unit 7. The slide 10 is mounted slidably on the base member 11 on a guide plane indicated at 13 which extends at an inclined angle with respect to the axis of the spindle 3 and thus the axis of rotation 4 of the rotor. The inclined guide plane 13 may also be formed by suitable guide means such as guide bars or rails which are produced for example by grinding on the base member 11. The inclined guide plane is disposed at an angle a with respect to the axis of the spindle 3 or the axis of rotation 4 of the rotor.

In the embodiment of the apparatus illustrated in FIG. 1 the two slides 9 and 10 are connected together by a connecting member 14 so that they are displaceable in combination with each other. To provide for that combined movement of the slides 9 and 10, the apparatus has an adjusting motor 12 which is operatively connected by way of a spindle drive 22 to the slide 9 which is thus in turn connected to the slide 10 by the connecting member 14, to provide for joint movement thereof.

Reference numerals 17 in FIG. 1 indicate bellows-type dust covers for the spindle drive 22 and the slide guide means.

Referring still to FIG. 1, the drilling unit 7 which forms the marking means carries a marking tool in the form of a drill 8. The drilling unit 7 is mounted on the slide 10 by way of an inclined support plate 26 of a configuration such as to compensate for the inclined positioning of the slide 10, whereby the axis 21 of the drill 8 extends parallel to the axis of rotation 4 of the rotor or the axis of the spindle 3. The housing of the drilling unit 7 is mounted on the slide 10 in stationary relationship therewith while the drill 8 is mounted displaceably in the direction of its axis 21 in the drilling unit 7. The drill 8 can thus be displaced in the axial direction thereof by way of a feed spindle (not shown) driven by an adjusting motor 15 carried on the drilling unit 7.

Alternatively however it is possible for the drilling unit 7 to be displaceable in the axial direction on the slide 10 by means of a suitable motor arrangement (not shown).

Reference numeral 18 in FIG. 1 denotes a drive motor for rotating the drill 8 of the drilling unit 7.

If, when the motor 12 is switched on, the two slides 9 and 10 are displaced towards the right in FIG. 1 on the base member 11, the axis 21 of the drill 8 moves downwardly in relation to the axis of rotation 4 of the rotor, thereby passing through a linear area indicated at 33 in FIG. 2 and referred to herein as the region of action of the marking tool. The possible region of action 33 of the marking tool or drill 8 is also identified by the double-headed arrow A in FIG. 2.

In the embodiment illustrated in FIGS. 1 and 2, as shown more specifically in FIG. 2, the region of action 33 of the marking tool or drill 8, within which the axis 21 of the drill 8 can be displaced, is disposed in a plane which is vertical with respect to the inclined guide plane 13 and which represents the plane of action of the tip of the drill 8. In operation of the apparatus, when the point at which the axis of inertia indicated at 6 in FIG. 2 of the rotor 1 passes through an end face thereof, that point being indicated at 19 in FIG. 2, has been determined and is to be marked by means of the drill 8, the move-mentioned region of action within which the axis 21 of the drill 8 is moved in the adjusting movement is to be disposed in the same plane as that in which the axis of rotation 4 (which corresponds to the axis of the spindle 3) and the determined axis of inertia 6 are disposed after the unbalance measuring operation. That common plane extends in the Y-direction in FIG. 2. Therefore, after the unbalance measuring operation, the rotor 1 is turned until the axis of inertia 6 is disposed in that plane.

However misalignment can mean that the axis of the spindle 3 is laterally displaced with respect to the above-mentioned vertical plane required for further operation of the arrangement. That lateral displacement is indicated by B in FIG. 2 from which it will be seen that the displacement B is in the X-direction and perpendicular to the Y-direction. That results in the region of action of the drill 8 on the end face of the rotor 1 also being displaced to the position indicated in broken lines in FIG. 2 at 33', instead of the region of action 33 extending through the position of the axis of rotation 4 of the rotor 1. To compensate for the displacement B as between the region 33' corresponding to the axis 21 of the drill 8 on the end face of the rotor, and the axis of rotation 4 or the axis of the spindle 3, the apparatus may have an adjusting screw 16 disposed laterally of the spindle 3, as shown in FIG. 2. The spindle 3 is mounted on a base frame structure 25 of the unbalance measuring unit 2 by way of the force-measuring pick-up 20 and spring members which are indicated more specifically in the form of leaf or blade springs 23. By virtue of that design configuration, the adjusting screw 16 can be used to displace the pick-up 20, together with the spindle 3, in the X-direction, that is to say radially with respect to the axis of rotation 4, and perpendicularly to the direction in which the region of action 33' extends on the end face of the rotor. The spindle 3 is thus displaced in the appropriate direction, with the springs 23 being appropriately deflected, until the axis of rotation 4 of the rotor is disposed in the plane in which the region of action 33, and thus the axis 21 of the drill 8, is moved in the above-mentioned vertical adjusting movement of the drill 8. The region of action 33 of the drill 8 is then in the required position on the end face of the rotor 1.

In a mass centering operation, in order to determine the static unbalance of the rotor 1, the rotor 1 is rotated in known manner by means of a drive (not shown) driving the spindle 3. The force-measuring pick-up 20 detects forces produced in the unbalance measuring unit 2 by virtue of an unbalance of the rotor 1, such forces acting through the spindle 3 of the unbalance measuring unit 2, and the pick-up passes corresponding signals to an electrical or electronic evaluation unit 5 which will be described in greater detail hereinafter with reference to FIG. 3. A sensing device 24 shown in FIG. 2 also supplies the evaluation unit 5 with a signal which is proportional to the speed of rotation of the spindle 3 while reference numeral 30 in FIG. 2 denotes an angle sensing device for detecting the angular position of the spindle 3 and therewith the rotor 1, in a manner which will be described in greater detail hereinafter.

Figure 3:
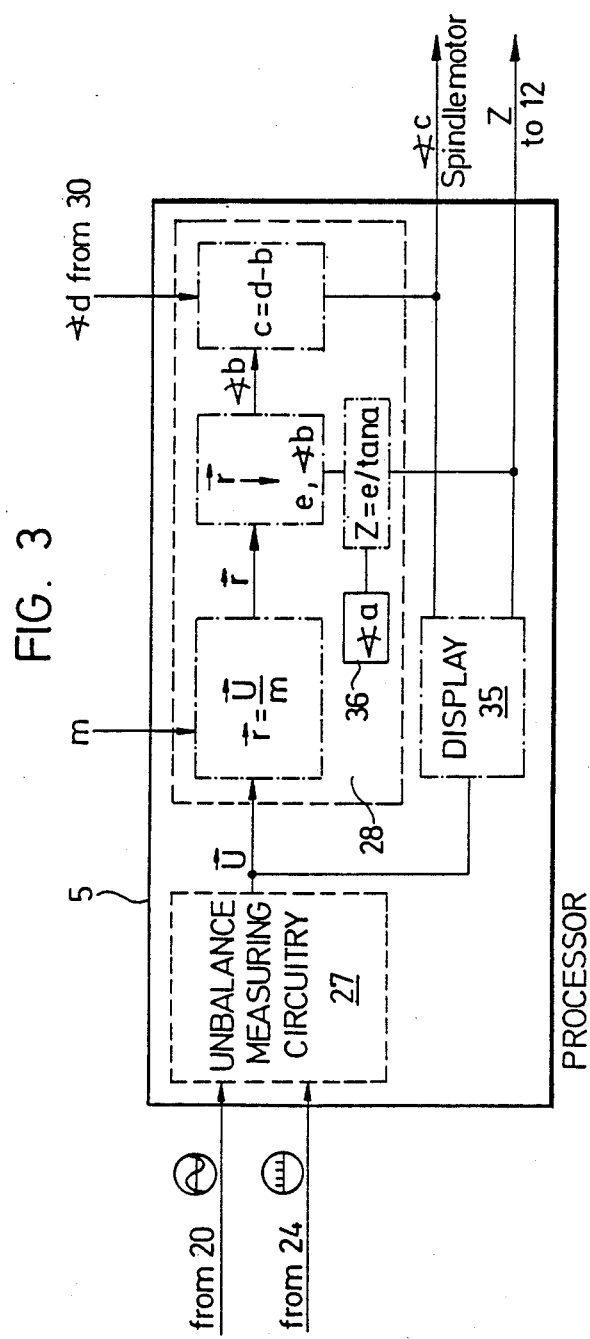
FIG. 3 is a block circuit diagram of an evaluation means used in the unbalance measuring arrangement.

The evaluation unit 5 is operable to determine the unbalance vector $\vec{U}$ of the rotor 1 from the signals of the pick-up 20 and the sensing device 24, by means of unbalance measuring circuitry as indicated at 27 in FIG. 3, of known components. The magnitude of the unbalance is preferably determined in gmm.

Referring still to FIG. 3, the evaluation unit 5 also includes a mass centering circuit 28 which receives as inputs the unbalance vector $\vec{U}$ and the mass m of the rotor, preferably in grams (g). The position vector $\vec{r}$ of the axis of inertia 6 which extends through the center of mass of the rotor 1, the position vector having its starting point at the axis of rotation 4, is determined in accordance with the relationship: $\vec{r} = \vec{U}/m$ in the mass centering circuit 28.

The position vector $\vec{r}$ which gives the position of the axis of inertia 6 in relation to the axis of rotation 4 of the rotor is used in the mass centering circuit 28 to ascertain the scalar magnitude e which gives the distance of the axis of inertia 6 from the axis of rotation 4, preferably in mm, and the angle b of the axis of inertia 6 relative to a reference or zero point indicated at 34 on the rotor 1 in FIG. 2. The point 34 is at a predetermined angular position relative to a reference or zero point 29 on the spindle 3, and is preferably at the same angular position. The angular positioning of the spindle 3 and therewith the rotor 1 relative to a reference position outside the spindle and the rotor can be ascertained at any time by means of the angle sensing device 30 referred to above, connected to the evaluation unit 5. In the embodiment illustrated in FIGS. 1 through 3, the angle sensing device 30 detects the respective angular position of the point 29 on the spindle 3 and therewith the angular position of the point 34 on the rotor, relative to a plane in which, after compensation for any displacement B which may be present, the tip of the drill 8 or the axis 21 of the drill 8 is moved with the linear adjusting movement A, also being the plane in which the axis of rotation 4 of the axis of the spindle 3 is disposed.

To perform the marking operation, assuming that the axis of inertia 6 is for example in a random position as indicated at 6' in FIG. 3, the axis of inertia must be moved into the position indicated at 6 in FIG. 2, in which it is in the above-defined range of action 33 of the marking tool or drill 8. In the illustrated embodiment the axis of inertia 6 is to be disposed in a position beneath the axis of rotation 4 in the region of action 33 of the tip of the drill 8.

For that purpose, the mass centering circuit 28 ascertains from any angular position d which corresponds to any position as indicated at 6' of the axis of inertia, the angle c through which the rotor 1 has to be turned from the above-mentioned angular position d at which the point 34 on the rotor is disposed, and the angular position b which is occupied by the axis of inertia 6 relative to the point 34 on the rotor 1. That operation is effected in the mass centering circuit 28 by a simple subtraction operation. As soon as the rotor has been turned through the angle c, the evaluation unit 5 can output a suitable cut-off pulse for the spindle drive motor (not shown) so that the motor is thus stopped and the axis of inertia 6 occupies the appropriate position shown in FIG. 2.

The evaluation unit 5 also passes to the adjusting motor 12 for displacement of the slides 9 and 10, a signal corresponding to the distance indicated at e in FIG. 3 of the axis of inertia 6 from the axis of rotation 4. The two slides 9 and 10 are then displaced by way of the spindle drive 22. When that happens, the slide 10 with the drilling unit 7 mounted thereon is moved downwardly with respect to the axis of rotation 4 until the tip or the axis 21 of the drill 8 is aligned with the axis of inertia 6 and the point 19 on the end face of the rotor 1, at which the axis of inertia 6 passes therethrough. Preferably the starting position adopted for the adjusting movement referred to above is the position of the axis 21 of the drill 8, in which the axis 21 is aligned or coincident with the axis of rotation 4.

Figure 6:
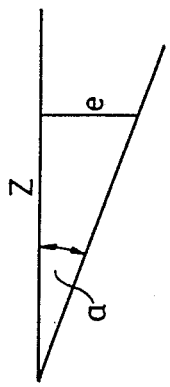

So that the tip of the drill 8 performs an adjusting movement corresponding to the distance e, with respect to the axis of rotation 4, the two slides 9 and 10 are displaced by the motor 12 by a distance indicated at Z in FIG. 6. The distance Z, which is the displacement of the two slides 9 and 10 in an axial direction in parallel relationship with the axes 4 or 21, is ascertained from the relationship $Z = e/\tan a$ which is illustrated in detail in FIG. 6; as already indicated above, a represents the angle of the inclined guide plane 13 with respect to the axis of rotation 4, or the angle between the two slides 9 and 10, as can be clearly seen from FIG. 1. The mass centering circuit 28 forms a signal corresponding to the distance Z from the signal corresponding to the distance e, and a further signal which is supplied by a memory shown at 36 in FIG. 3 and corresponding to the stored angle a. The signal corresponding to the distance Z is then applied to the motor 12 to produce the appropriate movement of the slides 9 and 10.

The magnitudes of the distance Z and the angle c can be displayed at a display means 35 of the evaluation unit 5.

A necessary region of action 33 may be of a length of about 0.5 mm. A distance Z of about 200 mm is sufficient for a corresponding adjusting movement within the region of action 33. That then involves an inclination in respect of the guide plane 13 relative to the axis of rotation 4 of 1:400. It is also possible to use a higher ratio to provide for even finer centering movements. It has been found however that a sufficiently high level of resolution in regard to the adjusting movement of the drill 8 can be achieved by means of a commercially available slide drive arrangement. In addition, the mechanical wear involved in the components which are displaceable relative to each other is uniformly distributed over the above-mentioned distance for example of 200 mm representing an adequate distance in respect of the movement Z. It will be appreciated that the entire configuration and also mode of operation of the system are extremely simple.

In the illustrated embodiment, as shown for example in FIG. 2, the axis of inertia 6 for the marking operation has been turned into the plane in which the region of action 33 of the drill 8 is disposed, beneath the axis of rotation 4. It will be appreciated that it is also possible for the axis of inertia 6 to be turned into a marking position within the region of action 33 of the drill 8, which is above the axis of rotation 4. In that case it is then necessary for the tip of the drill to be raised with respect to the axis of rotation 4 when the slide 10 performs its adjusting movement along the inclined plane 13 on the base member 11.

When the tip of the drill 8 is aligned with the axis of inertia 6, the motor 15 is switched on to produce axial displacement of the drill 8 towards the point 19 at which the axis of inertia 6 passes through the end face of the rotor 1. The drill 8 is then driven in rotation by operation of the motor 18 and the marking for the axis of inertia 6 is thus formed on the end face of the rotor 1 at the appropriate point 19.

In the embodiment shown in FIG. 1, the two slides 9 and 10 together with the components disposed thereon, namely the unbalance measuring unit 2 and the drilling unit 7, are moved jointly in the adjusting movement produced by operation of the motor 12. In addition, in that adjusting movement, the slide 10 is moved along the inclined guide plane 13 so that the drill 8 is positioned at the desired spacing e from the axis of rotation 4.

It is also possible however to achieve the same effect by the slide 9 which carries the unbalance measuring unit 2 being guided along a corresponding guide plane 13 so that the rotor 1 is moved along the line representing the desired spacing e. In that arrangement the drill 8 remains at a stationary position in respect of the height thereof. However, to produce the marking on the end face of the rotor 1 at the point 19 at which the axis of inertia 6 passes therethrough, the drill 8 is then displaced in the axial direction by means of the adjusting motor 15.

Figure 4:
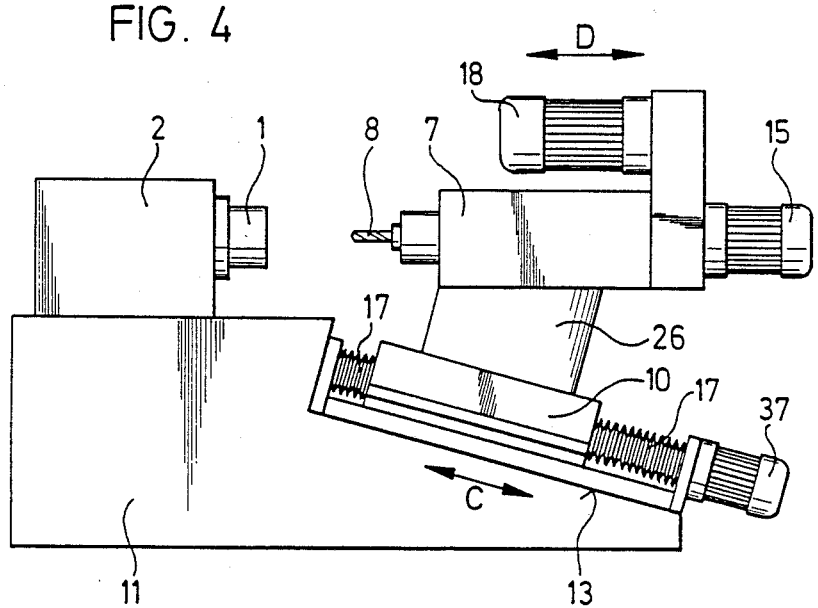
FIG. 4 shows a second embodiment of the apparatus in accordance with the invention.

Referring now to FIG. 4, shown therein is a further embodiment of an apparatus in accordance with the present invention in which the unbalance measuring unit 2, for carrying the rotor 1, is disposed at a stationary location on the common base member 11 of the apparatus. The drilling unit 7 is carried on a slide 10 which is movable along an inclined plane 13 in the direction indicated by the double-headed arrow C. That adjusting movement of the slide 10 on the guide plane 13 is produced by the drive of an adjusting motor 37. That provides for adjustment of the drill 8 by the necessary distance which is indicated at e in FIG. 2, in relation to the axis of rotation 4 of the rotor 1. In addition, the drilling unit 7 or the drill 8 alone can be moved in the axial direction, by operation of the adjusting motor 15, to move the drill 8 into the position for producing the marking on the end face of the rotor 1 at which the axis of inertia 6 passes therethrough. That movement of the drill 8 or the drilling unit 7 is indicated by the double-headed arrow D in FIG. 4.

Figure 5:
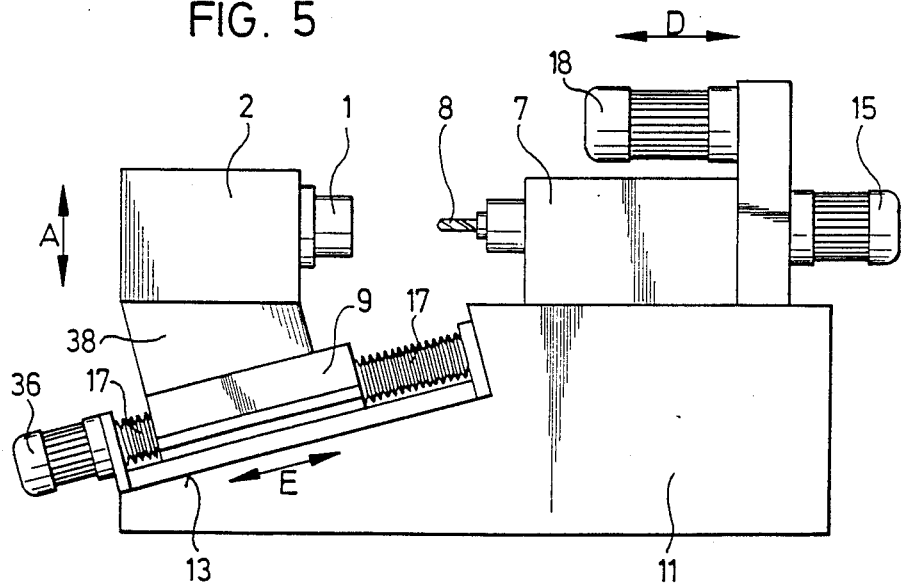
FIG. 5 shows a third embodiment of an apparatus in accordance with the present invention, and FIG. 6 a diagram illustrating the adjusting movement produced in the method and apparatus of the invention.

In the embodiment shown in FIG. 5, it is the slide 9 which carries the unbalance measuring unit 2 with the rotor 1 carried thereby that is guided along an inclined guide plane 13 on the common base member 11. The necessary displacement on the plane 13, which is indicated by a double-headed arrow E in FIG. 5, is produced by operation of an adjusting motor 36 which moves the slide 9 by way of a spindle drive (not shown). To compensate for the angle of inclination of the guide plane 13, the unbalance measuring unit 2 is secured to the slide 10 by means of a mounting plate 38 of a suitably sloping configuration.

The adjusting movement of the slide 9 in the direction of the arrow E causes the rotor 1 to be displaced by the necessary distance referenced e in FIG. 2 so that the point at which the axis of inertia 6 passes through the end face of the rotor 1 can be brought into opposite relationship to the tip of the drill 8 of the drilling unit 7. To produce the marking at the end face of the rotor 1, the drill 8 or the entire drilling unit 7 can be displaced in the direction indicated by the double-headed arrow D in FIG. 5, on the base member 11, by operation of the adjusting motor 15, the drive force of which is transmitted to the drill 8 or the drilling unit 7 by way of a spindle drive (not shown).

After the centering operation has been carried out, it is possible to perform a check measuring operation on a separate unbalance measuring apparatus. That unbalance measuring apparatus may be an independent balancing machine or a component of the above-described mass centering machine. The unbalance measuring apparatus has a holding fixture with which the rotor can be held in a centered condition at the marking produced thereon, in particular in the form of a centering bore therein. In performing the check measuring operation therefore the rotor is rotated about its primary axis of inertia. The rotor should suffer from unbalance which lies only within small tolerances. The balancing result which is obtained in the check measuring operation may be used for calibration of the above-described mass centering machine. For that purpose for example the adjusting screw 16 may be adjusted by hand or by means of an adjusting motor (not shown). It is also possible appropriately to alter the zero or starting position in respect of the adjusting movement of the slides 9 and 10 (FIG. 1 embodiment) or the slide 10 (FIG. 4 embodiment) or the slide 9 (FIG. 5 embodiment). That can be effected by hand or the result of the check measuring operation can be inputted into a computing means of the mass centering machine so as to provide for automatic calibration. The calibration can be automatically monitored at intervals and corrected as required.

The accompanying drawings show embodiments of the mass centering apparatus of a horizontal design configuration, but it will be noted that it is also possible to use the same construction of the mass centering apparatus, which is of a vertical configuration.

It will be appreciated that the above-described apparatuses, and the methods of mass centering involved therein, have been described solely by way of example and illustration of the principles of the invention and that various modifications and alterations may be made therein without thereby departing from the spirit and scope of the invention.

What is claimed is:

1. Apparatus for mass centering of a rotor including: an unbalance measuring means for measuring the unbalance of the rotor, comprising a rotary spindle for carrying the rotor and means for rotating the spindle about an axis of rotation in the unbalance measuring operation; an evaluation means operatively connected to the unbalance measuring means for ascertaining from the result of the unbalance measuring operation and the weight of the rotor the position of the axis of inertia thereof which extends through the center of mass of the rotor, with respect to said axis of rotation; a marking means comprising a marking tool for marking the position of the axis of inertia of the rotor on an end face thereof; and an adjusting mean for producing a relative displacement between the rotor and the marking tool in a radial direction with respect to the axis of rotation and parallel to the axis of rotation, the adjusting means including guide means for guiding one of said rotor and said marking means in said relative displacement, being disposed at an inclined angle with respect to the axis of rotation, whereby said relative displacement determines on said end face of the rotor a linear region of action of the marking tool which extends through said axis of rotation, such that the point on the end face of the rotor at which the measured axis of inertia passes therethrough can he turned into said region of action of said marking tool.

2. Apparatus as set forth in claim 1 wherein said adjusting means comprises a first slide carrying one of said unbalance measuring means and said marking means, a second slide carrying the other of said unbalance measuring means and said marking means, a first guide slidably guiding one of the slides parallel to said axis of rotation of the rotor and a second guides slidably guiding the other slide inclinedly at said inclined angle with respect to the axis of rotation of the rotor.

3. Apparatus as set forth in claim 2 wherein said first slide carries said unbalance measuring means with said rotor and is slidably guided by said first guide, and said second slide carries said marking means and is slidably guided by said second guide.

4. Apparatus as set forth in claim 1 comprising a one-piece base member supporting said unbalance measuring means and said marking means, said base member providing a guide plane disposed at an inclined angle with respect to the axis of rotation of the rotor, thereby constituting said guide means.

5. Apparatus as set forth in claim 1 including further guide means for guiding the other of said rotor and said marking means in parallel relationship with the axis of rotation of the rotor.

6. Apparatus as set forth in claim 1 wherein said adjusting means comprise first and second slides each carrying a respective one of said unbalance measuring means and said marking means, and further comprising a base member providing said guide means for guiding said first and second slides jointly displaceably thereon.

7. Apparatus as set forth in claim 6 and further comprising a connecting means interconnecting said first and second slides.

8. Apparatus as set forth in claim 1 wherein said unbalance measuring means, in relation to said spindle for carrying said rotor in an unbalance measuring operation, has means for adjusting said spindle in a radial direction with respect to the axis of rotation of the rotor and perpendicularly to said linear region of action of said marking tool.

9. Apparatus as set forth in claim 1 including means for fixing the rotor in a marking operation in a position in which the axis of rotation and the axis of inertia thereof are disposed in a common plane extending perpendicularly to the guide plane defined by said inclined guide means.

10. Apparatus as set forth in claim 1 and further including a slide carrying said marking means and guided on said guide means at an inclined angle with respect to the axis of rotation of the rotor.

11. Apparatus as set forth in claim 1 wherein said adjusting means comprises a first slide carrying one of said unbalance measuring means and said marking means, a second slide carrying the other of said unbalance measuring means and said marking means, a first guide slidably guiding one said slide in parallel relationship to the axis of rotation of the rotor, a second guide slidably guiding the other said slide inclinedly at said angle with respect to the axis of rotation of the rotor, wherein said inclined guide for the other of said first and second slides is adapted, for said adjusting movement as between the rotor and the marking tool, in the adjusting direction, to determine a component of motion in the common plane in which the axis of rotation and the axis of inertia of the rotor lie, in a radial direction with respect to said axis of rotation.

12. Apparatus as set forth in claim 11 wherein said marking means is carried by said other slide guided by said second guide, thereby to perform said relative displacement with respect to the rotor in the common plane for the axis of rotation and the axis of inertia of the rotor.

13. Apparatus as set forth in claim 1 wherein said marking tool comprises a drill so arranged that the axis of the spindle of the unbalance measuring means and the axis of the drill coincide in the initial position of said adjusting means.

14. Apparatus as set forth in claim 1 wherein said guide means disposed at an inclined angle with respect to the axis of rotation is arranged to provide a guided movement in a radial direction away from the axis of rotation of the rotor in said relative displacement between the rotor and the marking tool.

15. Apparatus as set forth in claim 1 comprising a base member which provides said guide means disposed at an inclined angle with respect to the axis of rotation of the rotor, and a slide slidably carried on said guide means, wherein said unbalance measuring means is mounted at a stationary location on said base member and said marking means is carried on said slide.

16. Apparatus as set forth in claim 1 comprising a base member which provides said guide means disposed at an inclined angle with respect to the axis of rotation of the rotor, and a slide slidably carried on said guide means, wherein said marking means is mounted at a stationary location on said base member and said unbalance measuring means is carried on said slide.

17. A method of calibrating an apparatus as set forth in claim 1 wherein after said axis of inertia of said rotor has been determined, said rotor is turned about its said axis of inertia and an unbalance measuring operation is performed on the rotor, the initial position of said adjusting means then being corrected in dependence on the measure unbalance remaining in the rotor.

18. A method as set forth in claim 17 and further comprising correcting displacement of said spindle of said unbalance measuring means in a radial direction with respect to the axis of rotation thereof and perpendicularly to the correcting displacement of said initial position.

19. In a method of mass centering of a rotor comprising:

measuring the unbalance of the rotor;
determining from the result of the unbalance measuring operation and the mass of the rotor, the position of the axis of inertia of the rotor with respect to the axis of rotation thereof; and
marking the point at which the axis of inertia passes through an end face of the rotor, on said end face, by means of a marking tool having a punctiform working surface,
the improvement which provides that, to mark the point at which said axis of inertia passes through said end face of the rotor, the rotor is turned into an angular position such that said point is disposed in a plane in which the axis of rotation of the rotor is disposed and in which the working surface of said marking tool is linearly displaceable with respect to said axis of rotation.

20. A method as set forth in claim 19 wherein said tool is guided with respect to the axis of rotation of the rotor on an inclined surface disposed at an angle with respect to the axis of rotation of the rotor.

* * * * *